Aug. 2, 1966  K. O. G. HEROLF  3,263,838
TRACTOR VEHICLES FOR MOVING FELLED TREES
Filed March 1, 1965  2 Sheets-Sheet 2
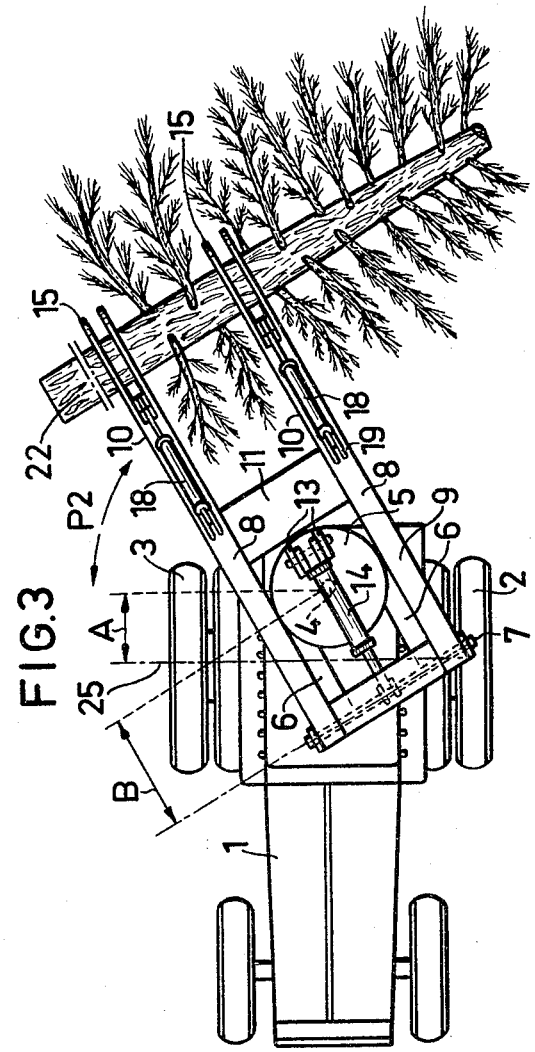

3,263,838
TRACTOR VEHICLES FOR MOVING FELLED TREES
Kjell Olof Gunnar Herolf, Sundsbruk, Sweden, assignor to Sunds Verkstader Aktiebolag, Sundsbruk, Sweden
Filed Mar. 1, 1965, Ser. No. 436,021
Claims priority, application Sweden, Mar. 2, 1964, 2,549/64
2 Claims. (Cl. 214—132)

The present invention relates to means adapted for permanent or detachable mounting on tractor vehicles and the like, said means serving for moving felled trees. In particular, said means is well suited for the transportation of unlopped trees and/or unbarked trunks from the ground or from timber stock to a barking machine or a lopping machine stationed at a distance therefrom.

The means according to the invention comprises at least one lifting arm, consisting of two rigidly interconnected shanks, which form a considerable angle with each other, one of said shanks having grasping claws at its free end for grasping the trees or trunks to be transported, the other shank being, at its free end, substantially horizontally pivoted to a holder provided on the tractor, said holder being adapted to turn on a substantially vertical pivot. For the purpose of grasping and releasing a trunk movable grasping claws are provided on the lifting arms, said claws being actuatable by substantially hydraulically or pneumatically operatable working cylinders. For raising and lowering the lifting arms proper, there is likewise, one or more hydraulically or pneumatically actutable cylinders provided in a suitable manner between said arms and said turnable holder.

According to the invention the vertical pivot of the holder supporting the lifting arms is located in a plane which is substantially perpendicular to the longitudinal direction of the tractor vehicle, said plane being positioned behind or before a plane, parallel thereto and extending through, respectively, the shaft carrying the rearmost and the shaft carrying the foremost supporting wheels of the vehicle. The length of said distance may vary, depending on the construction of the tractor on which the means according to the invention is to be mounted. Another feature of the invention is that the distance between the substantially vertical pivot of the lifting device and the substantially horizontal shaft of the lifting arms is longer than the just mentioned distance between the vertical pivot and the shaft of, respectively, the rear wheels and the front wheels of the vehicle.

The abovementioned features provide for a construction which, with the continued use of rigid lifting arms, makes it possible to lift a load without the same, when in its lifted position, being at a considerable distance away from the vehicle, in which case it would exert an inconveniently great moment on the tractor, which would limit the size of the load allowed.

Figure 1:
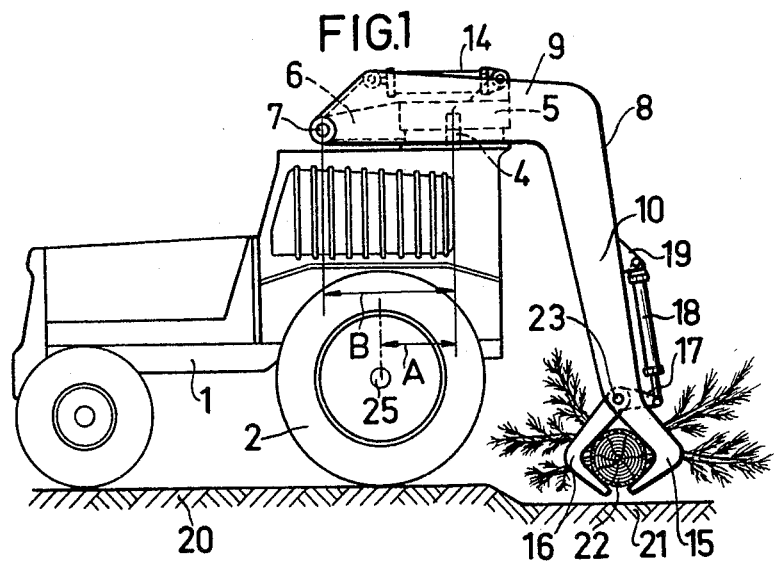

A more detailed description of the invention will follow below, reference being had therein to the accompanying drawing, in which FIGURE 1 is an elevation of a tractor vehicle, on which there is mounted lifting means in accordance with one embodiment of the invention, FIGURE 2 being a rear view of the assembly shown in FIGURE 1 and FIGURE 3 being a plan view of said assembly.

The tractor 1, shown in the drawing, has two pulling rear wheels 2, 3 and may be of a conventional construction. The invention is not confined to this type of a tractor in et per se, because the lifting means according to the invention may be applied to various kinds of such vehicles. In the embodiment shown the lifting means is mounted to turn on a pivot 4, provided on the top of the driver's cab. The pivot 4 is substantially vertical and serves as a pivot for a holder 5, which is provided with arms 6, which at their ends are interconnected by a substantially horizontal shaft 7. On said shaft there are turnably mounted rigid, angular lifting arms 8, each of said arms comprising one first shank 9, the main portion of which extends substantially horizontally above the driver's cab of the tractor 1, one second shank 10 forming a considerable angle with said first shank 9 and being directed downwards for the purpose of making it possible to pick up the lopped or unlopped trunks 22, for the transportation of which the means is intended. The arms 8 are rigidly interconnected through the intermediary member 11 at the middle portions of the arms.

Figure 2:
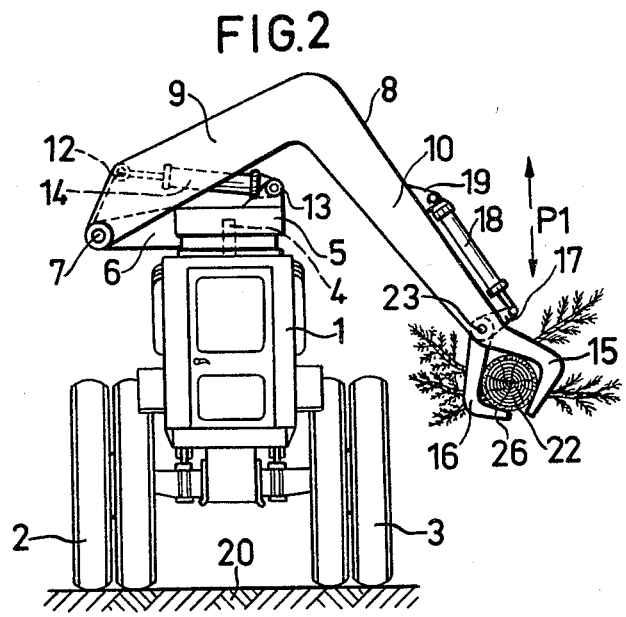

The rigid construction thus formed by the arms 8 is adapted to swing up and down on the shaft 7, as indicated by the arrows P1 in FIGURE 2, by means of a motor, for instance a hydraulic or a pneumatic working cylinder 14, which is mounted between, on one hand, lugs 13 on the holder 5 and, on the other hand, the joint 12. FIGURE 1 shows the lifting means when in its fully lowered position, FIGURE 2 showing the lifting means, when in a raised position, obtained through the action of the working cylinder 14. At the same time the entire lifting means is adapted to turn on the vertical pivot 4, as indicated by the arrows P2 in FIGURE 3. The turning movement on the pivot 4 may be allowed to take place to such an extent that a trunk can be caused to extend parallel with one side of the vehicle 1, as shown in FIGURE 2, after the trunk having first been grasped when in a position in which it extends perpendicularly to the longitudinal direction of the vehicle, as shown in FIGURE 1, or from any other position, in which case it may, in connection with a modifiied embodiment, be the question of grasping a trunk, extending parallel with the longitudinal direction of the vehicle, at one side of the vehicle and—while causing the lifting means to perform a turning movement—moving the trunk over to the opposite side of the vehicle and parallel therewith.

The very grasping of the trunks 22 is effected by grasping claws 15, 16, provided on each shank 10 of each arm 8, one claw, 15, being rigid in relation to its respective shank 10, and the other claw, 16, being adapted to turn on a shaft 23, mounted on the respective shank 10, each such claw 16 also having an extended portion 17. Between a stationary lug 19, situated farther up on each shank 10, and said extended portion 17 there is provided a hydraulic or pneumatic working cylinder 18 for operating the movable grasping claw 16. In accordance with the invention the lower, movable grasping claw 16 is shaped in such a manner that when the claw is being actuated, for the purpose of releasing a trunk, the trunk carrying portion 26 of said claw will move with no or with only a slight downwardly directed component of movement. This will result therein that the lifting means will, more or less momentarily, be relieved from the load of the trunk, when grasping claw 16 is being swung outwards, by which any delay in unloading, caused by resilience action of the tractor vehicle, is avoided.

The shank 10 should be long enough to make it possible to grasp a tree 22, which is on the same level as the level 20 of the tractor. In accordance with the invention it is suitable to extend the shank 10 to such a length that also trunks being on a level 21 below the ground level 20 can be grasped easily, because topographical conditions often create situations in which such a possibility is valuable.

Especially in the lastmentioned case the trunk 22—if the arms 8 were mounted to turn on a shaft 7 positioned centrally on the tractor—when in its lifted position would be situated so far away from the tractor that the moment exerted by the trunk would jeopardize the stability of the vehicle. In order to prevent this two constructive measures have been taken in accordance with the invention.

According to one measure the vertical pivot 4 for the holder 5 is positioned at a suitable distance A behind the axle 25 of the rear wheels 2 of the vehicle. The distance A may vary, depending thereon to what type of a tractor the lifting means is to be applied. In case of a tractor of a normal construction and size said distance A is, for instance, about 0.5 meter. By positioning the pivot 4 in this way the radius from said pivot to the grasping claws 15, 16 of the lifting means is reduced. Thereby the distance from the trunk 22 to the vehicle will be reduced also in the position shown in FIGURE 2, according to which the trunk extends parallel with the longitudinal direction of the vehicle, due to which the moment of the trunk exerted on the vehicle will be reduced.

Also, the positioning of the horizontal shaft 7 of the arms 8, in accordance with the invention, contributes to the reduction of the distance between the trunk 22 and the vehicle in the critical position of the trunk when the trunk is extending parallel with the vehicle. Said horizontal shaft is not positioned in the same vertical plane as the vertical pivot 4 but at a considerable distance B on the other side of said pivot with respect to the grasping claws 15, 16. It is obvious that by positioning the shaft 7 in this way there is obtained, on one hand, a reduction in the increase of the distance between the trunk 22 and the tractor 1 arising in connection with the upward swinging movement of the arms 8 and, on the other hand, a constructionally simple positioning of the working cylinder 14 serving for raising the arms 8. In accordance with the invention the distance B can be substantially longer than the distance A between the pivot 4 and the rear axle 25 of the vehicle, attention being, however, called to the fact that also said distance B must be chosen with respect to the type of a tractor to which the lifting means according to the invention is to be applied.

The means according to the invention is meant to be used in particular for grasping and transporting felled but unlopped or unbarked trunks and for feeding the same into, respectively, a lopping machine and a barking machine. In that case it is important that the tractor driver shall have the possibility of carrying out the feeding operation with the accuracy required. This will be obtained if the trunk has a fixed position in relation to the tractor so that by operating the tractor the driver can handle the trunk in the right way. The fixed position of the trunk is guaranteed by arranging, according to the invention, the rigid arms 8 in the above described manner. It is obvious that by an articulated arm construction—in lieu of the rigid arms 8—together with suitable operating members it would be possible to obtain a lifting device by means of which trunks could be grasped at various distances from the tractor and be moved into a position parallel with the tractor and as close to the tractor as could be desirable, but such a construction would, on one hand, become expensive and, on the other hand, present the drawback of not making it possible to fix the position of the trunk relatively to the tractor in the exact way that is desirable for enabling the tractor driver to feed the trunks into, respectively, a lopping machine and a barking machine with the accuracy required.

The invention is not limited to the embodiment as shown and described, because it may be modified in many ways within the scope of the invention. Thus it may be mentioned that in connection with certain tractors, for instance, of the truck type, the lifting means according to the invention may, preferably, be arranged in such a manner that the vertical pivot 4 is positioned at a distance A before the front wheel axle of the vehicle, if the front wheels are, in such type of tractor, mainly responsible for the lateral stability of the vehicle. Furthermore, it may be pointed out that, in certain cases, the two arms 8 may be replaced by one single arm. In the embodiment shown the vertical pivot 4 and the horizontal shaft 7 are positioned on top of the driver's cab at a considerable distance above the rear wheel axle 25 of the vehicle, a distance which amounts to between 1.5–2.5 meters. Said positioning may be varied and, in connection with certain kinds of tractors, it is possible to make use of, or build up, a separate platform for mounting thereon the lifting means according to the invention.

Having now described my invention, what I claim as new and desire to secure by Letters Patent is:

1. A tractor vehicle for moving felled trees having front and rear axles and a structure defining an operating space for the driver, a vertical pivot mounted on said housing, a holder rotatably mounted on said pivot, a horizontal shaft mounted on said holder at a substantial distance from said pivot, a load lifting arm having a first shank and a second shank rigidly connected at an end of each to each other at a substantial angle, said first shank normally extending over said holder with its free end connected to said horizontal shaft, said second shank normally extending downwardly adjacent said housing with tree grasping means secured to the free end thereof, means for rotating said holder, means for raising and lowering said lifting arm and means for operating said tree grasping means, said pivot being in a vertical plane at a substantial distance from one of said axles on the side thereof remote from the other of said axles and said horizontal shaft being at a substantial distance from said pivot on the side thereof opposite to said second shank.

2. A tractor as defined in claim 1 in which the distance from said horizontal shaft to said pivot is greater than the distance of said pivot from said axle.

References Cited by the Examiner

UNITED STATES PATENTS 2,877,915  3/1959  Puim _____ 214—132 X

FOREIGN PATENTS 575,948  5/1959  Canada.
575,992  5/1959  Canada.

HUGO O. SCHULZ, *Primary Examiner.*